United States Patent [19]

Temme et al.

[11] Patent Number: 4,718,542

[45] Date of Patent: Jan. 12, 1988

[54] FIXING OF ATTACHMENTS TO THE SIDE WALLS OF THE PANS OF SCRAPER-CHAIN CONVEYORS

[75] Inventors: Helmut Temme, Waltrop; Manfred Redder, Lünen, both of Fed. Rep. of Germany

[73] Assignee: Gewerkschaft Eisenhutte Westfalia, Postfach, Fed. Rep. of Germany

[21] Appl. No.: 327,773

[22] Filed: Dec. 7, 1981

[30] Foreign Application Priority Data

Jan. 28, 1981 [DE] Fed. Rep. of Germany ....... 3102702

[51] Int. Cl.[4] ............................................. B65G 19/28
[52] U.S. Cl. .................................................. 198/735
[58] Field of Search ............ 198/735, 860, 861, 860.2, 198/860.3, 86.1; 411/401, 104

[56] References Cited

FOREIGN PATENT DOCUMENTS

| 1286489 | 1/1969 | Fed. Rep. of Germany | ...... 198/735 |
| 1109090 | 4/1968 | United Kingdom | ................. 198/735 |
| 2078653 | 1/1969 | United Kingdom | ................. 198/735 |
| 2084532 | 9/1980 | United Kingdom | ................. 198/735 |

*Primary Examiner*—Joseph E. Valenza
*Assistant Examiner*—Kyle Shane
*Attorney, Agent, or Firm*—Thompson, Birch, Gauthier & Samuels

[57] ABSTRACT

To facilitate the fixing of attachments to the side walls of scraper-chain conveyors upstanding recesses are provided in the side walls in upper regions where the upper flanges merge with the side walls. The recesses, which can be milled, open from the upper flanges and have a depth less than the thickness of the side wall upper regions. The recesses are generally U-shaped as viewed from the exterior. The recesses are enlarged or undercut internally to be deeper all round so as to provide shaped pockets which exactly match the shape of non-circular heads of threaded elements which are received therein and fill the recesses.

8 Claims, 7 Drawing Figures

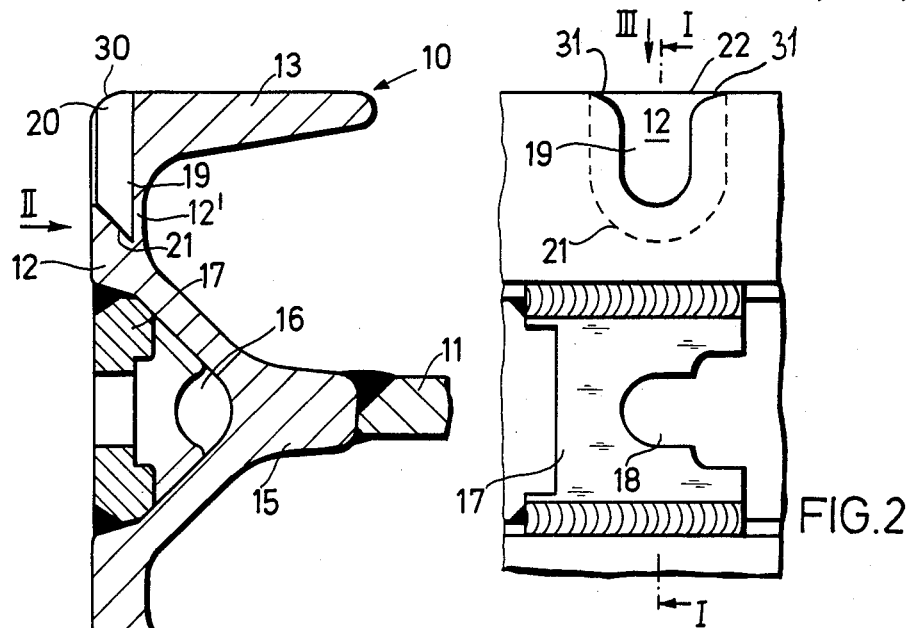
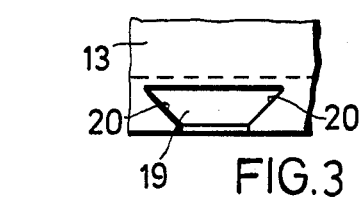
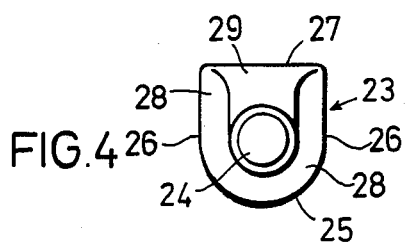
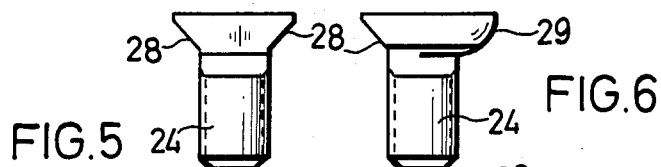
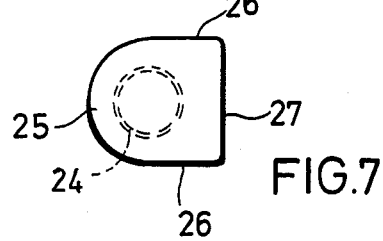

FIXING OF ATTACHMENTS TO THE SIDE WALLS OF THE PANS OF SCRAPER-CHAIN CONVEYORS

BACKGROUND TO THE INVENTION

The present invention relates in general to scraper-chain conveyors as used in mineral mining and more particularly to the fixing of attachments to the side walls of the channel sections or pans of the conveyor.

It is well known to utilize threaded members to fix various attachments such as spill plates, rails, hoods, channels and guides to the side walls of the pans of a scraper-chain conveyor. The individual pans of the conveyor normally have sigma-shaped side walls and a floor plate therebetween. A central deep V-shaped groove is present in the exteriors of the side walls and holders for locating bolts are fitted into the grooves to enable the attachments to be secured. It is also known to provide rectangular holes in the upper flanges of the side walls to receive the heads of bolts (German Gebrauchmuster No. 19151116) and to provide vertical recesses at the upper regions of the side walls where the upper flanges merge with upstanding webs leading to the V-shaped grooves (German Patent Specification No. 1286489). In the latter case, the recesses have a trapezoidal shape and again receive the heads of conventional bolts. Bolts with heads of rectangular shape are employed and when fitted these heads only partly fill the recesses or holes. If the recesses extend through the upper webs of the side walls there is a danger that material, especially fine coal dust, can find its way into the recesses. The circulating scraper-chain assembly also has to pass alongside the open recesses and if the bolts become loose there is a danger that the assembly will be impeded and damage can occur. Furthermore the smooth profile of the side walls of the pans is interrupted by the recesses or holes and this is disadvantageous especially where a winning machine is moved back and forth alongside the side walls.

It is also known to reinforce the side walls of the pans of a conveyor by welding bars or strips to the exterior (German Patent Specification Nos. 2516082 and 2531861). These bars or strips can themselves be provided with recesses open from above into which the heads of bolts can be received.

A general object of the present invention is to provide an improved method of fixing attachments to the side walls of the pans of a scraper-chain conveyor.

SUMMARY OF THE INVENTION

In accordance with the invention, recesses are provided directly in the side wall of a conveyor pan at the upper region where the upper flange merges with the upper web. These recesses have a depth smaller than the thickness of the upper webs and are relieved or undercut internally to provide shaped pockets which snugly receive correspondingly shaped heads of threaded fixing elements. The heads of the fixing elements essentially fill the recesses and the problems discussed hereinbefore are avoided. The recesses open to the upper flange and have a generally U-shaped profile as viewed from the side. The internal relief can extend around the lower curved region of the recesses, which can be semi-circular, and right up to the upper flange. An inclined or frusto-conical internal face can be provided by the relief to engage with a similarly shaped external edge of the head of the fixing element. The head is thus fully supported at its side edges as well as the lower curved edge and rotation is inhibited.

Conveniently the recesses are milled in one or both side walls of the conveyor pan and are distributed along its length. Where the recesses are not in use however it is preferable to insert filler components which resemble the heads of the fixing elements and fill the recesses.

The present invention also extends to the fillers and fixing elements with heads especially adapted to have a shape conforming with the recesses.

The invention may be understood more readily, and various other features of the invention may become apparent, from consideration of the following description.

BRIEF DESCRIPTION OF DRAWING

An embodiment of the invention will now be described, by way of exmaple only, with reference to the accompanying drawings wherein:

FIG. 1 is a sectional end view of one of the side walls of a conveyor channel section or pan constructed in accordance with the invention, the view being taken along the line I—I of FIG. 2;

FIG. 2 is a side view of part of the side wall shown in FIG. 1, the view being aken in the direction of arrow II in FIG. 1;

FIG. 3 is a plan view of part of the side wall shown in FIG. 1, the view being taken in the direction of arrow III in FIG. 2;

FIG. 4 is an end view of a threaded fixing element or bolt used with the side wall shown in FIGS. 1 to 3, the view being taken beneath the head of the element;

FIG. 5 is a side view of the threaded fixing element shown in FIG. 4;

FIG. 6 is another side view of the threaded fixing element shown in FIG. 4, the view being taken in a direction transposed through 90° in relation to the direction adopted in FIG. 5; and FIG. 7 is an end view of the threaded fixing element shown in FIG. 4, the view being taken in the direction opposite to that adopted in FIG. 4.

DESCRIPTION OF PREFERRED EMBODIMENT

FIGS. 1 to 3 depict one of two side walls 10 of a channel section or pan of a scraper-chain conveyor. As is known, the individual pans are connected end-to-end in a manner permitting some degree of relative displacement. Each pan is composed of sigma-shaped side walls 10 with a floor plate 11 therebetween. The side walls 10 are usually rolled piece-parts and the floor plate 11 is welded between the opposed side walls 10. As shown in FIG. 1, the side wall 10 represented has upper and lower inwardly-directed flanges 13,14 and a central flange 15 to which the floor plate 11 is welded. Inclined wall portions merge with the flange 15 and define an external V-shaped groove 16 running along the entire length of the wall 10. Upstanding webs 12 join the flanges 13,14 to the inclined wall portions. As is known supports or holders 17 are distributed along the wall 10 and welded into the groove 16. The holders 17 serve to mount attachments, such as spill plates, to the exterior of the wall 10 and have lateral shaped recesses 18 (FIG. 2) for receiving the heads of fixing bolts.

As shown in FIGS. 1 to 3, additional recesses 19 are provided in the upper webs 12 of the wall 10 and preferably above each holder 17. The recesses 19 open to the upper flange 13 and to the exterior of the wall 10. The latter openings are generally U-shaped as shown in FIG. 2. However the recesses 19 are undercut or relieved internally as shown in FIGS. 2 and 3 to be wider and deeper within the exterior openings to provide pockets into which the heads of threaded fixing elements shown in FIGS. 4 to 7 are received. The depth of the recesses 19 is such that a thin web 12' with a thickness of approximately 3 to 6 mm lies behind the recesses 19. In general, the depth of the recesses 19 is about ¾ to 5/6 of the full thickness of the web 12. The internal base 21 of each recess 19 (FIGS. 1 and 2) has a semi-circular profile with a centre of curvature aligned with the longitudinal axis of the fixing element received therein. The undercut or relieved region of each recess 19 takes a frusto-conical form with an internal surface inclined at an angle of about 45° to the horizontal over the entire pocket except at the upper opening 22. The outer U-shaped profile of each recess 19 has edge surfaces merging with the upper surface of the flange 13 over smooth radiused transition regions 30,31.

The fixing elements shown in FIGS. 4 to 7, can be easily inserted with their heads into the pockets provided by the recesses 19 or removed therefrom via the upper openings 22. The heads of the fixing elements are snugly received in the pockets essentially completely filling the latter. As shown in FIGS. 4 to 7, the preferred form of fixing element has a head 23 and a threaded shank 24. The head 23 is asymmetrical with a non-circular shape. The head 23 has a semi-circular edge portion 25 with an axis of curvature aligned with the longitudinal axis of the shank 24. The portion 25 merges with rectilinear edge portions 26 and the head 23 has a similarly flat edge portion 27 opposite the curved portion 25. The head 23 merges with the shank 24 by way of an inclined face 28 which matches the internal undercut surface of the recesses 19 and takes a U-shaped end profile as shown in FIG. 4. The head 23 has a rounded region 29 as shown in FIG. 6 with a radius of curvature matching that of the region 30 of the recess 19 where the web 12 merges with the flange 13.

As can be appreciated the heads 23 of the fixing elements are shaped to fit snugly in the pockets of the recesses 10 with the surfaces 28,21 in supportive engagement. The heads 23 are thus reliably held captive to the wall 10 with their shanks 24 projecting outwardly therefrom to receive nuts. Accessories can thus be secured to the wall 10 with the aid of these elements and the complementary nuts. The elements can also assist the holders 17 in securing attachments to the wall 10 by providing additional fixings just above the bolts located by the holders 17.

The recesses 19 can be milled in the side wall 10 at spaced locations. Where the recesses 19 are not used it is advisable to introduce fillers into the recesses 19 to provide a smooth profile for the wall 10. These fillers can be used temporarily or more or less permanently and in the latter case the fillers can be spot welded into the recesses 19. The fillers (not shown) can correspond in shape to the heads 23 of the fixing elements so as to fill up the recesses 19 entirely. By spot welding the fillers these components can still be removed from the recesses 19 if desired by breaking the spot welds Other ways of securing the fillers in position can also be adopted; for example, the fillers can be made of resilient deformable plastics material force-fitted into the recesses 19. The fillers or fixing elements adapt to the profile of the wall 10 and do not produce any discontinuities. Moreover such components preclude material from passing into the recesses 19 and do not intrude on the inner parts of the side walls 10 or the pan.

We claim:

1. A channel section or pan for a scraper-chain conveyor, said pan having sigma-shaped side walls with a floor plate therebetween, each side wall having upper and lower flanges and upper and lower webs, wherein at least one of the side walls is provided with shaped recesses in the upper web, each shaped recess being open to the exterior of the side wall and to the upper flange and having a depth less than the thickness of the upper web, each recess being generally U-shaped from the exterior of the upper web and internally relieved to provide a pocket and at least one screw-threaded fixing element with a head of U-shaped configuration matching the shape of the recesses so as to be snugly received within the pocket of one of the recesses substantially completely to fill said one recess.

2. A pan according to claim 1, wherein the internal relief of each recess extends around the sides and a lower curved region thereof.

3. A pan according to claim 2, wherein the internal relief of each recess provides an inclined surface adapted to engage with a similarly-shaped external edge of the head of the associated fixing element.

4. A pan according to claim 1, wherein the depth of each recess is about ¾ to 5/6 of the thickness of the upper web.

5. A pan according to claim 1, wherein the upper and lower webs of each side wall are separated by an external central V-shaped groove and holders are fixed into the side wall having the recesses in locations below the respective recesses, the holders serving to locate the heads of bolts.

6. A pan according to claim 1, wherein a plurality of said fixing elements are provided, some of the recesses containing the heads of said fixing elements and the other recesses which are not so used containing fillers which conform in shape to the heads of the fixing elements and which substantially completely fill the other recesses.

7. A pan according to claim 6, wherein the fillers are secured in their associated recesses by spot welding.

8. A pan according to claim 1, wherein each recess has a curvilinear base and the head of said at least one fixing element is similarly curved at one end and wherein said fixing element has a screw-threaded shank with an axis on the centre of curvature of the curved end of the head.

* * * * *